United States Patent
Suzuki et al.

(10) Patent No.: US 7,466,108 B2
(45) Date of Patent: Dec. 16, 2008

(54) BATTERY CHARGING CONTROL DEVICE

(75) Inventors: Hidetoshi Suzuki, Numazu (JP);
Hirofumi Yamaguchi, Numazu (JP);
Shuichi Muramatsu, Numazu (JP);
Masaki Asari, Numazu (JP)

(73) Assignee: Kokusan Denki Co., Ltd., Shizuoka Ken (JP)

( * ) Notice: Subject to any disclaimer, the term of this patent is extended or adjusted under 35 U.S.C. 154(b) by 152 days.

(21) Appl. No.: 11/652,941

(22) Filed: Jan. 12, 2007

(65) Prior Publication Data
US 2007/0164713 A1    Jul. 19, 2007

(30) Foreign Application Priority Data
Jan. 13, 2006   (JP) .............................. 2006-005638

(51) Int. Cl.
*H02K 7/00* (2006.01)
*H02P 9/00* (2006.01)

(52) U.S. Cl. .......................................... 322/37; 322/24

(58) Field of Classification Search ................... 322/10, 322/22, 23, 28, 37, 59
See application file for complete search history.

(56) References Cited

U.S. PATENT DOCUMENTS

| | | | | |
|---|---|---|---|---|
| 5,561,363 A | * | 10/1996 | Mashino et al. | 322/25 |
| 5,581,172 A | * | 12/1996 | Iwatani et al. | 322/28 |
| 7,106,028 B2 | * | 9/2006 | Iwatani | 322/28 |
| 7,170,263 B2 | * | 1/2007 | Yamamoto et al. | 322/59 |
| 7,224,148 B2 | * | 5/2007 | Watanabe et al. | 322/59 |
| 7,315,149 B2 | * | 1/2008 | Kizawa et al. | 322/28 |

FOREIGN PATENT DOCUMENTS

JP   2003-111299   4/2003

* cited by examiner

*Primary Examiner*—Nicholas Ponomarenko
(74) *Attorney, Agent, or Firm*—Pearne & Gordon LLP

(57) ABSTRACT

A battery charging control device comprising a control circuit that performs control to keep a voltage across a battery charged by an output of an AC generator around a target value, comprising: a load driving switch inserted between the battery and a load; and a load driving switch control circuit that performs control to turn on the load driving switch when the AC generator generates the output and a voltage across the load is equal to or lower than a set value, and turn off the load driving switch when the voltage across the load exceeds the set value lower than the target value of the voltage across the battery.

9 Claims, 2 Drawing Sheets

BATTERY CHARGING CONTROL DEVICE

TECHNICAL FIELD OF THE INVENTION

The present invention relates to a battery charging control device that controls a voltage across a battery so as not to exceed a target value while charging the battery with a rectification output of an AC generator.

BACKGROUND OF THE INVENTION

When a battery is mounted in a vehicle or the like driven by an engine, the battery is charged by a rectification output of an AC generator driven by the engine. When the battery is thus charged by the output of the AC generator, a battery charging control device that controls charging of the battery needs to be provided.

The battery charging control device comprises: a rectification and output adjustment circuit that can switch between a state where an output of an AC generator is rectified to supply a charging current to a battery, and a state where the supply of the charging current from the AC generator to the battery is stopped; and a battery voltage adjustment control circuit that controls the rectification and output adjustment circuit so as to supply the charging current from the AC generator to the battery when a voltage across the battery is equal to or lower than a target value, and stop the supply of the charging current to the battery when the voltage across the battery exceeds the target value.

In two-wheel vehicles, outboard motors, agricultural machinery, or the like, a magneto generator is used as an AC generator driven by an engine. When the magneto generator is used, a rectification and output adjustment circuit of generator output short-circuit type is frequently used. The rectification and output adjustment circuit comprises a diode bridge full-wave rectifier circuit that rectifies the output of the AC generator, and a generator output short-circuit switch element which is connected in anti-parallel with each of diodes that form a lower side of a bridge of the diode full-wave rectifier circuit, and a short circuit for short-circuiting the output of the AC generator is constituted by the generator output short-circuit switch element and some of diodes that form the lower side of the diode full-wave rectifier circuit when the generator output short-circuit switch element is turned on.

The generator output short-circuit switch element may be connected in anti-parallel with each of diodes that form an upper side of a bridge of said diode full-wave rectifier circuit. In this case, the short circuit for short-circuiting the output of the AC generator is constituted by the generator output short-circuit switch element and some of diodes that form the upper side of the diode full-wave rectifier circuit when the generator output short-circuit switch element is turned on.

FIG. 2 shows a construction of a conventional battery charging control device using a rectification and output adjustment circuit of generator output short-circuit type. In FIG. 2, a reference numeral 1 denotes a magneto generator driven by a prime motor such as an engine, and 2 denotes a rectification and output adjustment circuit. The rectification and output adjustment circuit 2 is comprised of a diode bridge full-wave rectifier circuit constituted by diodes D1 to D6, and thyristors S1 to S3 as generator output short-circuit switches connected in anti-parallel with the diode D4 to D6 on a lower side of a bridge of the rectifier circuit.

An output of the generator 1 is input into AC input terminals 2u, 2v and 2w of the rectification and output adjustment circuit 2, and a battery 4 is connected between DC output terminals 2a and 2b of the rectification and output adjustment circuit 2 through a fuse 3. An appropriate load (a motor in the shown example) 6 is connected between the output terminals 2a and 2b of the rectification and output adjustment circuit 2 through a load switch 5.

A battery voltage adjustment control circuit 7 comprised of a transistor TR1, a Zener diode ZD1, and resistances R1 to R8 is connected between the DC output terminals 2a and 2b of the rectification and output adjustment circuit 2.

In the battery charging control device in FIG. 2, the Zener diode ZD1 is in off state when a voltage across the battery 4 is equal to or lower than a target value. At this time, no base current passes through the transistor TR1, and thus the transistor TR1 is in off state. When the transistor TR1 is in off state, no trigger signal is provided to the thyristor S1 to S3, thus the output of the AC generator 1 is not short-circuited, and a charging current is supplied from the generator 1 to the battery 4 through the rectification and output adjustment circuit 2. When the load switch 5 is closed, a drive current is supplied from the generator 1 and the battery 4 to the load 6.

When the voltage across the battery 4 exceeds the target value, the Zener diode ZD1 is turned on, thus the base current passes through the transistor TR1 to turn on the transistor, and trigger signals are simultaneously provided from an output terminal side of the rectification and output adjustment circuit 2 to the thyristors S1 to S3 through the transistor TR1 and the resistances R1 to R3. At this time, the output of the generator 1 is short-circuited through any of the thyristors S1 to S3 and any of the diodes D4 to D6 to stop the supply of the charging current to the battery 4. This reduces the voltage across the battery 4. When the voltage across the battery 4 is reduced, the Zener diode ZD1 is turned off to stop the supply of the base current to the transistor TR1, thus the transistor TR1 is turned off to stop the provision of the trigger signals to the thyristors S1 to S3. When the provision of the trigger signals to the thyristors S1 to S3 is stopped, the thyristors S1 to S3 are turned off when an anode current of each thereof becomes equal to or lower than a holding current, and thus the charging current is supplied from the generator 1 to the battery 4 through the rectification and output adjustment circuit 2. Repeating these operations can keep the voltage across the battery 4 around the target value. Such a battery charging control device is disclosed in, for example, Japanese Patent Application Laid-Open Publication No. 2003-111299.

Conventionally, a large load has been rarely connected to a battery, and most currents output from a battery charging control device have been charging currents of the battery, but in recent years, a relatively large load (an electric load, hereinafter the same) such as a fuel pump used in a fuel injection device or a radiator fan motor has been connected to the battery. For agricultural machinery, a fertilization blower motor or the like is also a large load of a battery.

In order to drive the electric load and charge the battery without a hitch by using the conventional battery charging control device when the large load is connected to the battery, a generator having a large output suitable for the load needs to be used, but actually, the generator having a large output cannot be used in many cases because of a limited mounting position of the generator or limited costs. An insufficient output of the generator prevents sufficient charging of the battery, which may cause the battery to run out.

SUMMARY OF THE INVENTION

An object of the present invention is to provide a battery charging control device that can drive a load connected to a battery and charge the battery without a hitch even without using a generator having a large output.

The present invention is applied to a battery charging control device comprising: a rectification and output adjustment circuit that can switch between a state where an output of an AC generator is rectified to supply a charging current to a battery, and a state where the supply of the charging current from the AC generator to the battery is stopped; and a battery voltage adjustment control circuit that controls the rectification and output adjustment circuit so as to supply the charging current from the AC generator to the battery when a voltage across the battery is equal to or lower than a target value, and stop the supply of the charging current to the battery when the voltage across the battery exceeds the target value.

In the present invention, the device further comprises: a load driving switch that is inserted between the battery and a load of the battery and kept turned on while receiving a drive signal; and a load driving switch control circuit that performs control to provide a drive signal to the load driving switch and turn on the load driving switch when the AC generator generates the output and a voltage across the load is equal to or lower than a set value, and stop the provision of the drive signal to the load driving switch and turn off the load driving switch when the voltage across the load exceeds the set value. The set value of the voltage across the load is set to be lower than the target value of the voltage across the battery.

With the above described construction, when the value of a current passing through the load that uses the battery as power supply increases, the voltage applied to the load can be limited to as low a value as possible to generate surplus power, and the surplus power is used for charging the battery to reduce the risk of the battery running out.

The load driving switch control circuit may comprise: a drive signal supply switch that conducts when receiving a control signal from the output of the AC generator and provides the drive signal to the load driving switch; a control signal bypass switch provided to bypass the control signal from the drive signal supply switch and interrupt the drive signal supply switch when turned on; and a control signal bypass switch control circuit that keeps the control signal bypass switch turned off when the voltage across the load is equal to or lower than the set value, and turns on the control signal bypass switch when the voltage across the load exceeds the set value.

When the AC generator is a magneto generator, the rectification and output adjustment circuit may comprise a diode full-wave rectifier circuit that rectifies the output of the AC generator, and a generator output short-circuit switch element which is connected in anti-parallel with each of diodes that form a lower side of a bridge of the diode full-wave rectifier circuit, and a short circuit for short-circuiting the output of the AC generator is constituted by the generator output short-circuit switch element and some of diodes that form the lower side of the diode full-wave rectifier circuit when the generator output short-circuit switch element is turned on.

The generator output short-circuit switch element may be connected in anti-parallel with each of diodes that form an upper side of a bridge of the diode full-wave rectifier circuit. In this case, a short circuit for short-circuiting the output of the AC generator is constituted by the generator output short-circuit switch element and some of diodes that form the upper side of the diode full-wave rectifier circuit when the generator output short-circuit switch element is turned on.

The rectification and output adjustment circuit may comprise a control rectifier circuit that has a bridge in which one of lower and upper sides is formed by diodes, and the other is formed by thyristors, supplies a charging current to the battery when the thyristors are turned on, and stops the supply of the charging current to the battery when the thyristors are turned off.

The load driving switch preferably comprises an MOSFET.

BRIEF DESCRIPTION OF THE DRAWINGS

The above and other objects and features of the invention will be apparent from the detailed description of the preferred embodiment of the invention, which is described and illustrated with reference to the accompanying drawings, in which.

DETAILED DESCRIPTION OF THE PREFERRED EMBODIMENTS

Now, a preferred embodiment of the present invention will be described in detail with reference to FIG. 1.

Figure 1:
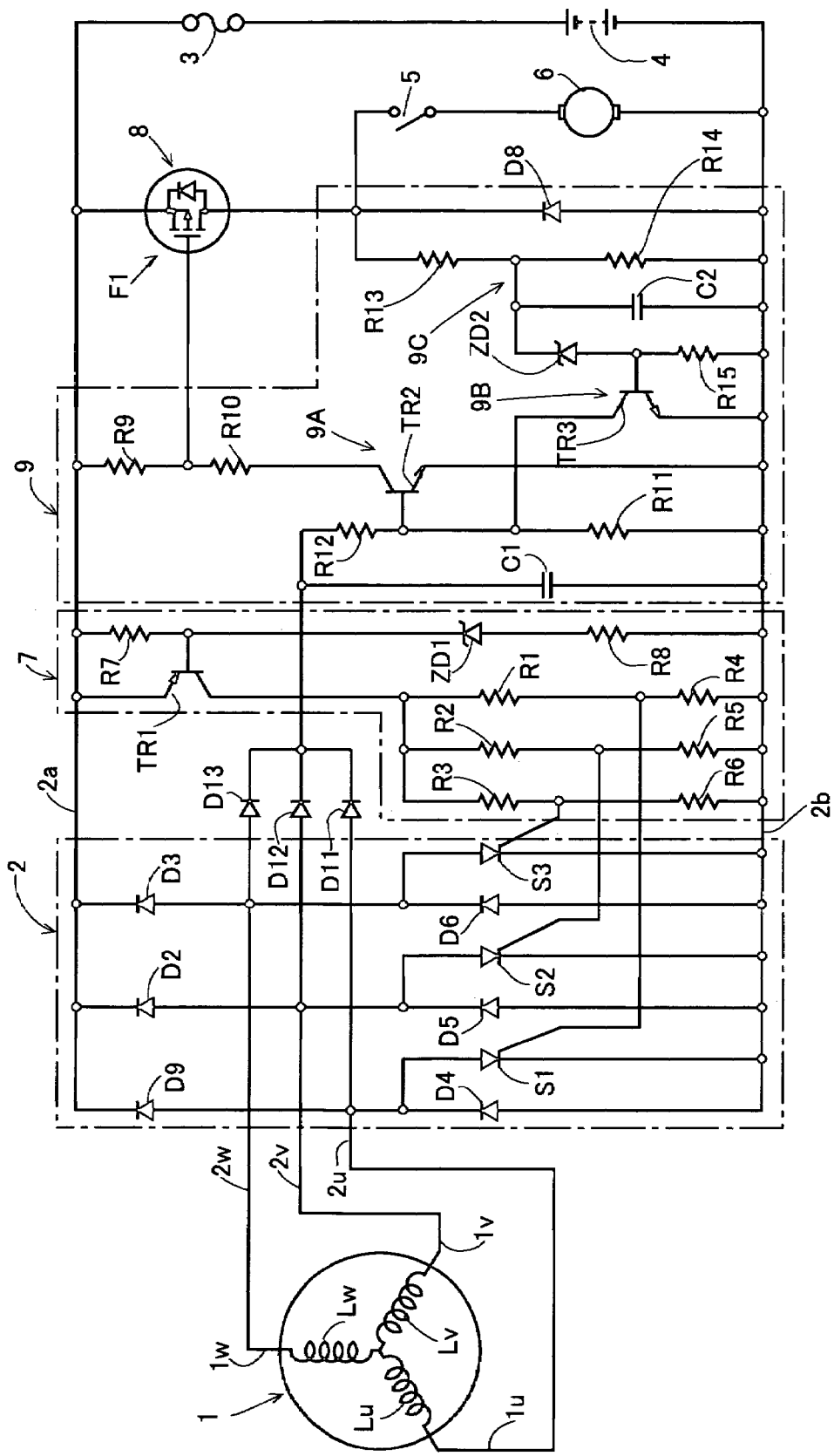
FIG. 1 is a schematic circuit diagram of a construction of a preferred embodiment of the present invention.

In FIG. 1, a reference numeral 1 denotes a magneto generator driven by a prime motor such as an engine. The magneto generator is comprised of an unshown magnet rotor rotatably driven by the prime motor, and a stator having three-phase armature coils Lu to Lw star connected, and induces a three-phase AC voltage in the armature coils Lu to Lw.

A reference numeral 2 denotes a rectification and output adjustment circuit, which is comprised of a diode bridge full-wave rectifier circuit constituted by diodes D1 to D6, and generator output short-circuit switches connected in anti-parallel with the diodes D4 to D6 on a lower side of a bride of the rectifier circuit. In the shown example, thyristors S1 to S3 are used as the generator output short-circuit switches. Three-phase AC input terminals 2u, 2v and 2w of the rectification and output adjustment circuit 2 are connected to three-phase output terminals of the generator 1, and a battery 4 is connected between DC output terminals 2a and 2b of the rectification and output adjustment circuit 2 through a fuse 3.

A source of a p-channel type MOSFET F1 that constitutes a load driving switch 8 is connected to a plus side output terminal 2a of the rectification and output adjustment circuit 2, and an appropriate load (a motor in the shown example) 6 is connected between a drain of the MOSFET and a minus side output terminal 2b of the rectification and output adjustment circuit. A flywheel diode D8 having an anode directed to the minus side output terminal 2b is also connected between the drain of the MOSFET and the minus side output terminal 2b of the rectification and output adjustment circuit.

A battery voltage adjustment control circuit 7 is also connected between the output terminals 2a and 2b of the rectification and output adjustment circuit 2. The control circuit is comprised of a PNP transistor TR1 having an emitter connected to the output terminal 2a, resistors R1, R2 and R3 having one ends commonly connected to a collector of the transistor TR1, and the other ends connected to gates of the thyristors S1 to S3, resistors R4 to R6 having one ends connected to the gates of the thyristors S1 to S3, and the other ends commonly connected to the minus side output terminal 2b of the rectification and output adjustment circuit, a resistor R7 connected between the emitter and a base of the transistor TR1, and a Zener diode ZD1 having a cathode connected to the base of the transistor TR1, and an anode connected to the minus side output terminal 2b through a resistor R8. The resistor R7 is resistance for adjusting sensitivity of the transistor TR1.

In the above described battery voltage adjustment control circuit 7, a target value (for example, 14 V) of a battery voltage is set by the Zener diode ZD1 and the resistor R8. When the voltage across the battery 4 is equal to or lower than the target value, the Zener diode ZD1 does not conduct, thus no base current passes through the transistor TR1, and the transistor TR1 is in off state. At this time, no trigger signal is provided to the thyristors S1 to S3, thus an output of the generator 1 is rectified through the full-wave rectifier circuit constituted by the diodes D1 to D6 and supplied to the battery 4 to charge the battery 4.

When the charging of the battery 4 continues, and the voltage across the battery 4 becomes equal to or higher than the target value, the Zener diode ZD1 conducts and the base current passes through the transistor TR1, thus the transistor TR1 is turned on, and trigger signals are simultaneously provided to the thyristors S1 to S3 through the transistor TR1 and the resistors R1 to R3. When the trigger signals are provided to the thyristors S1 to S3, any of the thyristors S1 to S3 that receives a forward voltage between an anode and a cathode conducts, and the output of the generator 1 is short-circuited through the conducting thyristor and any of the diodes D1 to S3 to stop the supply of the charging current to the battery 4.

When the voltage across the battery 4 becomes equal to or lower than the target value, the Zener diode ZD1 is turned off, thus the transistor TR1 is turned off to stop the provision of the trigger signals to the thyristors S1 to S3. In this case, the thyristors S1 to S3 are interrupted when an anode current of each thereof becomes lower than a holding current to release the short circuit of the output of the generator. This causes the charging of the battery to restart. Repeating these operations can keep the voltage across the battery 4 around the target value.

A collector of an NPN transistor TR2 is also connected to the plus side output terminal 2a of the rectification and output adjustment circuit 2 through a series circuit of a resistor R9 and a resistor R10, and an emitter of the transistor TR2 is connected to the minus side output terminal 2b. A base of the transistor TR2 is connected to the minus side output terminal 2b of the rectification and output adjustment circuit 2 through a resistor R11, and connected to a common connection point of cathodes of diodes D11 to D13 through a resistor R12, and anodes of the diode D11 to D13 are connected to the three-phase output terminals 1u to 1w of the magneto generator 1. A capacitor C1 is connected between the common connection point of the cathodes of the diodes D11 to D13 and the minus side output terminal 2b.

In the control device shown in FIG. 1, a series circuit of resistors R13 and R14 is connected in parallel with both ends of the diode D8 with the resistor R14 positioned on the anode side of the diode D8, and a capacitor C2 is connected in parallel with both ends of the resistor R14. A cathode of a Zener diode ZD2 is connected to a terminal of the capacitor C2 on the side of the resistor R13, and an anode of the Zener diode ZD2 is connected to the minus side output terminal 2b of the rectification and output adjustment circuit 2 through a resistor R15. The anode of the Zener diode ZD2 is also connected to a base of an NPN transistor TR3 having an emitter connected to the minus side output terminal 2b, and a collector of the transistor TR3 is connected to the base of the transistor TR2. The gate of the MOSFET F1 is connected to a connection point of the resistors R9 and R10. The transistors TR2 and TR3, the diode D8, the Zener diode ZD2, the capacitors C1 and C2, and the resistors R9 to R15 constitute a load driving switch control circuit 9. The control circuit 9 performs control to provide a drive signal to a load driving switch 8 and turn on the load driving switch when the AC generator 1 generates the output and a voltage across the load 6 is equal to or lower than a set value, and stop the provision of the drive signal to the load driving switch 8 and turn off the load driving switch when the voltage across the load 6 exceeds the set value.

The set value of the voltage across the load 6 is lower than the target value (for example, 14 V) of the voltage across the battery 4. The set value of the voltage across the load 6 is set by the resistors R13 and R14 and the Zener diode ZD2. The set value of the voltage across the load is preferably as low as possible (for example, 12 V) within a range that allows driving of the load.

In the load driving switch control circuit 9, the transistor TR2 constitutes a drive signal supply switch 9A that receives a control signal (a base current in this example) through the diodes D11 to D13 by the output of the AC generator 1 and thus conducts, and provides a drive signal to the load driving switch 8.

The transistor TR3 constitutes a control signal bypass switch 9B that bypasses the control signal from the drive signal supply switch (the transistor TR2) to interrupt the drive signal supply switch when turned on.

Further, the resistors R13 to R15, the capacitor C2, and the Zener diode ZD2 constitute a control signal bypass switch control circuit 9C that keeps the control signal bypass switch 9B turned off when the voltage across the load 6 is equal to or lower than the set value, and turns on the control signal bypass switch 9B when the voltage across the load 6 exceeds the set value.

Figure 2:
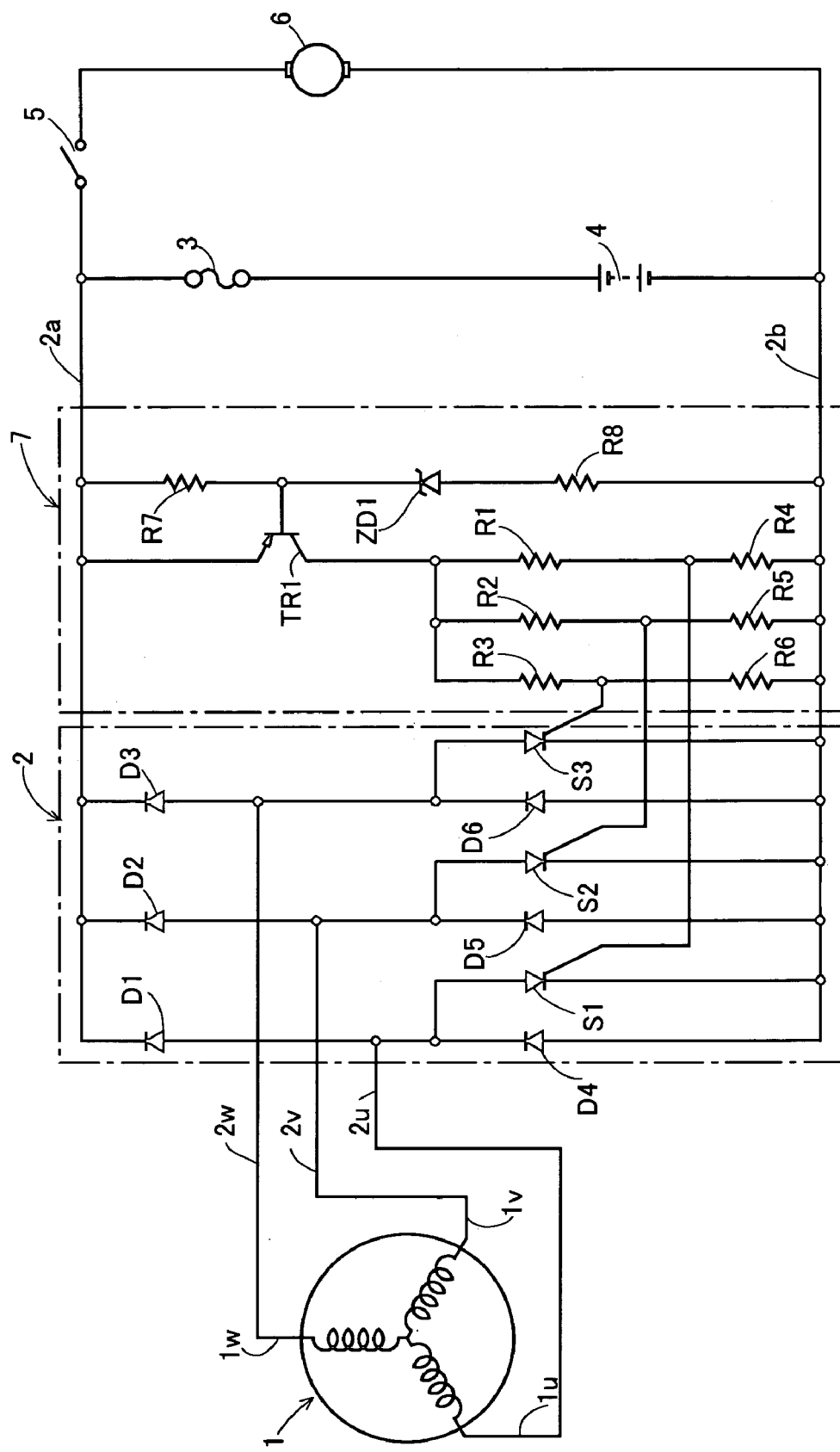
FIG. 2 is a schematic circuit diagram of an exemplary construction of a conventional battery charging control device.

In the battery charging control device shown in FIG. 2, when the generator 1 starts generation of power, the output of the generator 1 is rectified by the full-wave rectifier circuit constituted by the diodes D1 to D6 and supplied to the battery 4 to start charging of the battery 4. The voltage across the battery is kept around the target value by the above described operation.

When the generator generates the output, the base current (the control signal) is provided to the transistor TR2 through the diodes D11 to D13, and thus the transistor TR2 conducts. When the transistor TR2 conducts, an output voltage of the rectification and output adjustment circuit 2 and the voltage across the battery 4 cause a current to pass through the resistors R9 and R10 and the transistor TR2, and a voltage drop occurs at both ends of the resistor R9. Thus, a potential of the gate of the MOSFET F1 becomes lower than a potential of the source, and a drive signal is provided to the MOSFET F1. Thus, the MOSFET F1 is turned on, thus when the load driving switch 5 is in on state, the output voltage of the rectification and output adjustment circuit 2 and the terminal voltage of the battery 4 cause a current to pass through the MOSFET F1, the load driving switch 5, and the load 6 to drive the load 6.

When the voltage across the load 6 exceeds the set value lower than the target value of the battery voltage, the Zener diode ZD2 conducts, thus a base current passes through the transistor TR3, and the transistor TR3 conducts. When the transistor TR3 conducts, the base current of the transistor TR2 is bypassed from the transistor TR2, and thus the transistor TR2 is turned off to stop the provision of the drive signal to the MOSFET F1 (the load driving switch 8). Thus, the MOSFET F1 is turned off to stop energization to the load 6. When the voltage across the load 6 becomes equal to or lower than the set value, the Zener diode ZD2 is turned off and the transistor TR3 is turned off to restart the supply of the base current to the transistor TR2, and the transistor TR2 is turned on. This causes the provision of the drive signal to the MOSFET F1 to restart, and thus the MOSFET F1 is turned on to restart the energization to the load 6. Repeating these operations can keep the voltage across the load 6 around the set value lower than the target value of the voltage across the battery.

As described above, the load driving switch 8 that can perform on/off control is inserted between the battery 4 and the load 6 of the battery, and the load driving switch control circuit 9 is provided that performs control to turn on the load driving switch 8 when the AC generator 1 generates the output, and the voltage across the load 6 is equal to or lower than the set value sufficiently lower than the target value of the voltage across the battery 4, and turn off the load driving switch 8 when the voltage across the load 6 exceeds the set value. Thus, when the current passing through the load 6 increases, the voltage applied to the load 6 can be limited to as low a value as possible to generate surplus power, and thus the surplus power can be used for charging the battery 4 to reduce the risk of the battery running out.

In the above described embodiment, the rectification and output adjustment circuit 2 of generator output short-circuit type is used, but the present invention may be applied to the case where a control rectifier circuit that has a bridge in which one of lower and upper sides is formed by diodes, and the other is formed by thyristors, full-wave rectifies an output of a generator and supplies a charging current to a battery when the thyristors are turned on, and stops the supply of the charging current to the battery when the thyristors are turned off is used as a rectification and output adjustment circuit.

In the above described embodiment, the magneto generator is used as the generator 1, but the present invention may be applied to the case of using an excitation type AC generator. When the excitation type AC generator is used, a control rectifier circuit is used as a rectification and output adjustment circuit.

In the above described embodiment, the three-phase AC generator is used, but the present invention may be, of course, applied to the case of using a single-phase AC generator.

In the above described embodiment, the load driving switch 8 is constituted by the MOSFET, but the load driving switch 8 may be constituted by a switch element that can be controlled on/off, and the load driving switch 8 may be constituted by other switch elements such as a bipolar transistor. Although a preferred embodiment of the invention has been described and illustrated with reference to the accompanying drawings, it will be understood by those skilled in the art that it is by way of examples, and that various changes and modifications may be made without departing from the spirit and scope of the invention, which is defined only to the appended claims.

What is claimed is:

1. A battery charging control device comprising:
    a rectification and output adjustment circuit that can switch between a state where an output of an AC generator is rectified to supply a charging current to a battery, and a state where the supply of the charging current from said AC generator to said battery is stopped; and
    a battery voltage adjustment control circuit that controls said rectification and output adjustment circuit so as to supply the charging current from said AC generator to the battery when a voltage across said battery is equal to or lower than a target value, and stop the supply of the charging current to said battery when the voltage across said battery exceeds the target value,
    wherein said device further comprises:
    a load driving switch that is inserted between said battery and a load of said battery and kept turned on while receiving a drive signal; and
    a load driving switch control circuit that performs control to provide a drive signal to said load driving switch and turn on said load driving switch when said AC generator generates the output and a voltage across said load is equal to or lower than a set value, and stop the provision of the drive signal to said load driving switch and turn off said load driving switch when the voltage across said load exceeds the set value, and
    the set value of the voltage across said load is set to be lower than the target value of the voltage across said battery.

2. The battery charging control device according to claim 1, wherein said AC generator is a magneto generator, and
    said rectification and output adjustment circuit comprises a diode full-wave rectifier circuit that rectifies the output of said AC generator, and a generator output short-circuit switch element which is connected in anti-parallel with each of diodes that form a lower side of a bridge of said diode full-wave rectifier circuit, and a short circuit for short-circuiting the output of said AC generator is constituted by said generator output short-circuit switch element and some of diodes that form the lower side of said diode full-wave rectifier circuit when said generator output short-circuit switch element is turned on.

3. The battery charging control device according to claim 1, wherein said AC generator is a magneto generator, and
    said rectification and output adjustment circuit comprises a diode full-wave rectifier circuit that rectifies the output of said AC generator, and a generator output short-circuit switch element which is connected in anti-parallel with each of diodes that form an upper side of a bridge of said diode full-wave rectifier circuit, and a short circuit for short-circuiting the output of said AC generator is constituted by said generator output short-circuit switch element and some of diodes that form the upper side of said diode full-wave rectifier circuit when said generator output short-circuit switch element is turned on.

4. The battery charging control device according to claim 1, wherein said rectification and output adjustment circuit comprises a control rectifier circuit that has a bridge in which one of lower and upper sides is formed by diodes, and the other is formed by thyristors, supplies a charging current to said battery when said thyristors are turned on, and stops the supply of the charging current to said battery when said thyristors are turned off.

5. The battery charging control device according to claim 1, wherein said load driving switch comprises an MOSFET.

6. The battery charging control device according to claim 1, wherein said load driving switch control circuit comprises:
    a drive signal supply switch that conducts when receiving a control signal from the output of said AC generator and provides said drive signal to said load driving switch;
    a control signal bypass switch provided to bypass said control signal from said drive signal supply switch to interrupt said drive signal supply switch when turned on; and
    a control signal bypass switch control circuit that keeps said control signal bypass switch turned off when the voltage across said load is equal to or lower than said set value, and turns on said control signal bypass switch when the voltage across said load exceeds said set value.

7. The battery charging control device according to claim 6, wherein said AC generator is a magneto generator, and said rectification and output adjustment circuit comprises a diode full-wave rectifier circuit that rectifies the output of said AC generator, and a generator output short-circuit switch element which is connected in anti-parallel with each of diodes that form a lower side of a bridge of said diode full-wave rectifier circuit, and a short circuit for short-circuiting the output of said AC generator is constituted by said generator output short-circuit switch element and some of diodes that form the lower side of said diode full-wave rectifier circuit when said generator output short-circuit switch element is turned on.

8. The battery charging control device according to claim 6, wherein said AC generator is a magneto generator, and said rectification and output adjustment circuit comprises a diode full-wave rectifier circuit that rectifies the output of said AC generator, and a generator output short-circuit switch element which is connected in anti-parallel with each of diodes that form an upper side of a bridge of said diode full-wave rectifier circuit, and a short circuit for short-circuiting the output of said AC generator is constituted by said generator output short-circuit switch element and some of diodes that form the upper side of said diode full-wave rectifier circuit when said generator output short-circuit switch element is turned on.

9. The battery charging control device according to claim 6, wherein said rectification and output adjustment circuit comprises a control rectifier circuit that has a bridge in which one of lower and upper sides is formed by diodes, and the other is formed by thyristors, supplies a charging current to said battery when said thyristors are turned on, and stops the supply of the charging current to said battery when said thyristors are turned off.

\* \* \* \* \*